Sept. 21, 1937. W. A. INGALLS 2,093,726
SEED PLANTER
Filed May 23, 1936
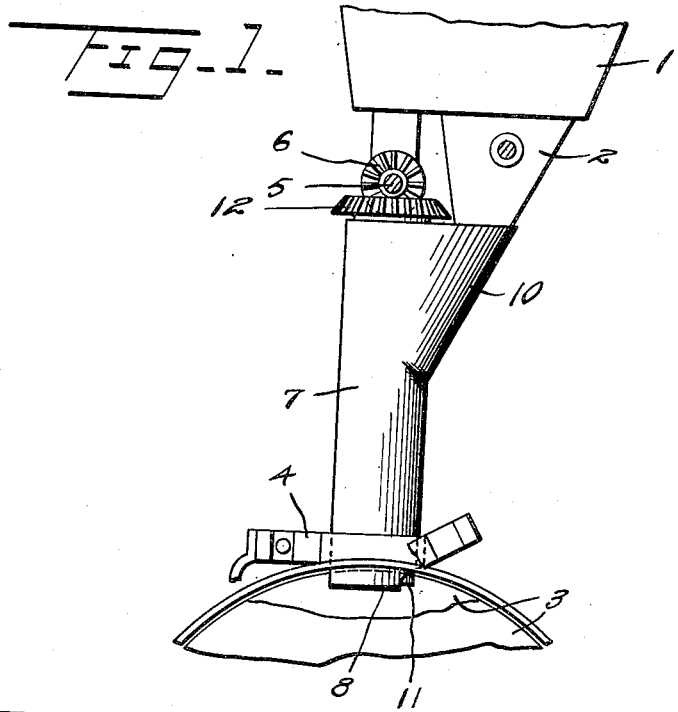
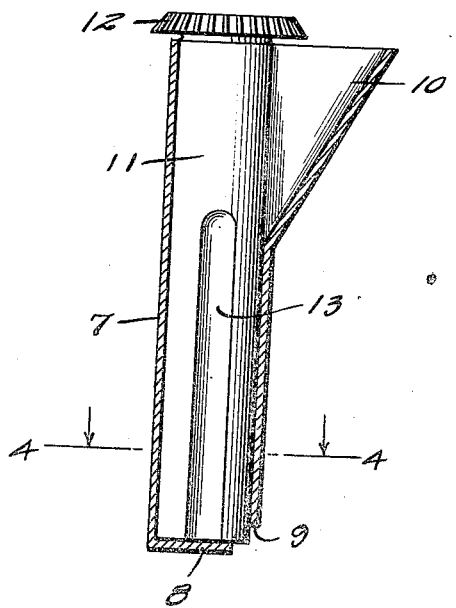
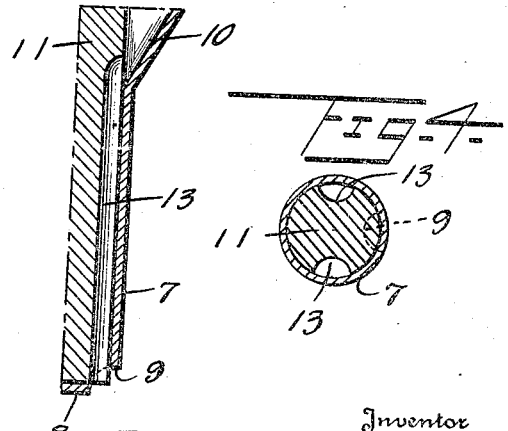
Inventor
W. A. Ingalls
By Watson E. Coleman
Attorney Patented Sept. 21, 1937

2,093,726

UNITED STATES PATENT OFFICE 2,093,726

SEED PLANTER

William A. Ingalls, Scottsbluff, Nebr., assignor of one-fourth to Stephen K. Warrick and one-fourth to Ross Hukill, both of Scottsbluff, Nebr.

Application May 23, 1936, Serial No. 81,534

4 Claims. (Cl. 111—14)

This invention relates to improvements in mechanism for planting seeds and pertains particularly to an improved drill for planting beet seeds.

The primary object of the present invention is to provide an improved mechanism for depositing seeds into a receiving furrow, singly and in accurately spaced relation.

Another object of the present invention is to conveniently provide a mechanism adapted to be attached to the present types of four or eight-row beet drills, without necessitating the changing of any of the present structure of the drill.

The invention broadly contemplates the provision of a receiving tube arranged at its upper end to provide an inlet funnel portion into which the seeds are discharged by the usual mechanism, and having its lower end disposed between the ground engaging disk wheels, with a rotating body in the tube having longitudinal grooves which receive seeds from the funnel-like body and discharge them singly at the lower end of the device between the disks and into the furrow formed by the disks.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 illustrates the device embodying the present invention in side elevation and showing the same applied to a beet drill;

Figure 2 is a vertical longitudinal section through the device per se;

Figure 3 is a detailed longitudinal section through a portion of the seed tube and the rotating core therein;

Figure 4 is a section on the line 4—4 of Figure 2.

Referring now more particularly to the drawing, wherein like numerals of reference designate corresponding parts throughout the several views, the numeral 1 indicates a conventionally illustrated seed box of a beet drill from which the usual discharge hopper 2 extends downwardly to direct seeds from the hopper into a tube by which they are conducted downwardly for discharge into the earth furrow between spaced disks, portions of which are indicated by the numeral 3.

The usual beet drill has a means 4 for securing the lower end of the seed tube in position with relation to the disks 3, and a drive shaft 5 is suspended beneath the hopper on which gears 6 are carried for the operation of an element of the seed planting structure.

The present invention comprises a seed discharge tube 7 having a closed lower end or bottom 8 and an outlet 9 in the corner between the bottom and the wall of the tube. At its upper end, the tube 7 is formed to provide the upwardly directed funnel-like receiver 10, which opens throughout its length into the body of the tube, as illustrated in Figure 2. This seed tube is substituted for the seed tube of the present beet drill structure and has its lower end disposed between the disks 3 and held in place by the securing element 4 while the funnel-like portion 10 at its upper end has the lower part of the seed discharge hopper 2 directed thereinto.

Rotatably disposed in the tube 7 is a solid body core 11, which rests upon the bottom wall 8 of the tube, and which has upon its upper end the beveled gear 12 which meshes with the gear 6 whereby the core will be rotated while the machine is in operation.

Formed in the face of the core 11 and extending longitudinally thereof is a groove 13, the lower end of which opens through the lower end of the core while the upper end extends only slightly above the point where the lower part of the funnel 10 merges with the tube 7. The groove 13 is of such a size that only a single seed can enter the upper end thereof from the funnel portion 10, and since the opening 9 at the lower end is of substantially the same size as the groove, it will be apparent that although there may be a line of seeds in the groove 13, only one at a time can pass from the discharge opening 9. The core 11 is shown as having two grooves 13 therein, but it will be obvious that one only need be employed, if desired.

From the foregoing, it will be apparent that during the period of operation of the beet drill, the core or cores, as there are usually four seed depositing units associated with each drill, will be constantly rotated, and as the seeds are fed from the hopper 2 into the funnel portion 10 of each tube, they will flow in single line down the grooves 13, and as each groove is brought around so that its lower end will register with the opening 9, a single seed will be discharged from the opening downwardly between the disks 3.

What is claimed is:—

1. As an attachment for a seed drill having a seed discharge hopper and earth furrow forming means, a tube adapted to be disposed vertically over said means and having at its lower end a seed discharge opening which is materially smaller than said end, funnel-like means forming a part of the upper end of the tube into which said hopper is adapted to discharge, a core body rotatably mounted in said tube, means forming a part of the core for transferring seed at timed intervals from said funnel-like upper portion of the tube to the outlet thereof longitudinally of the core, and means coupling the core with the drill mechanism for effecting the rotation of the core.

2. As an attachment for a seed drill having a seed discharging hopper and furrow forming means, a tube adapted to be disposed vertically between the hopper and said means and having a wall across its lower end and having a discharge opening through the lower end wall, funnel-like means at the upper end of said tube into which said hopper is adapted to discharge, a core body extending longitudinally through and filling the lower portion of the tube and resting upon said wall, means for conducting a seed from the funnel-like portion of the tube downwardly to the outlet opening, comprising a groove formed in the face of said core and having a length sufficient to bring its upper end slightly above the lowest point of said funnel-like portion whereby the number of seeds entering the groove from the said portion is controlled, the lower end of the groove discharging through the lower end of the core, and means for effecting the rotation of the core in the tube.

3. As an attachment for a seed drill having a seed discharging hopper and a furrow forming means therebeneath, a tube adapted to be disposed vertically beneath the hopper and between the same and said means and having a wall across its lower end, said wall having a discharge opening therethrough, a funnel-like body forming an integral lateral development of the upper end portion of the tube, a core body extending throughout the length of the tube and having an over-all diameter substantially equal to the interior diameter of the tube whereby the core body will snugly fit in the tube, the core body resting at its lower end upon said tube wall and terminating at its upper end adjacent the top of the tube, said core body having a groove formed longitudinally of its face from the lower end upwardly to a point slightly above the lower end of said funnel-like portion whereby said groove will periodically face the funnel-like portion in the rotation of the core to receive a single seed from the funnel-like portion, the lower end of the tube being adapted to pass over said end wall opening, said seed discharging hopper being designed to enter the funnel-like portion at the side of the core body, and means for coupling the upper end of the core body with the seed drill for effecting the rotation of the core.

4. In a seed drill having a seed hopper outlet, ground furrow-forming means therebeneath and a driven rotating member adjacent the outlet, a seed conveying tube disposed vertically above said means and having a seed outlet at its lower end, a cylindrical body rotatably retained within the tube and having a seed conducting groove formed in its surface and extending from its lower end upwardly through a major portion of its length, means coupling the upper end of the cylinder with said driven member, and means for conducting seed from the hopper outlet into the tube below the top thereof and into the upper end of the cylinder groove.

WILLIAM A. INGALLS.